Sept. 1, 1953 S. S. ROSENAK ET AL 2,650,709
CONTINUOUS EXTRACORPOREAL DIALYZER
Filed Aug. 6, 1948 2 Sheets-Sheet 1
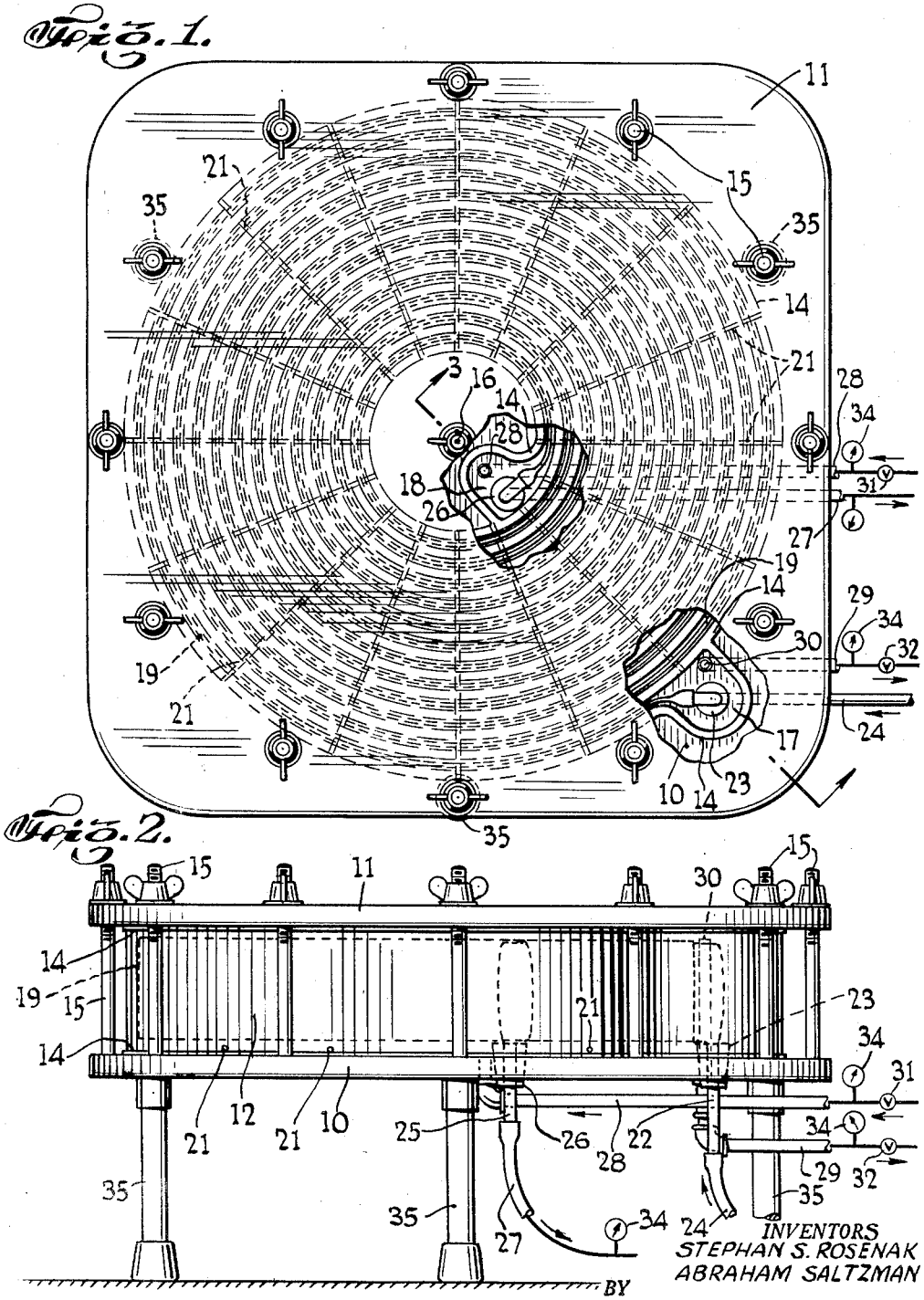
INVENTORS
STEPHAN S. ROSENAK
ABRAHAM SALTZMAN
BY
ATTORNEY

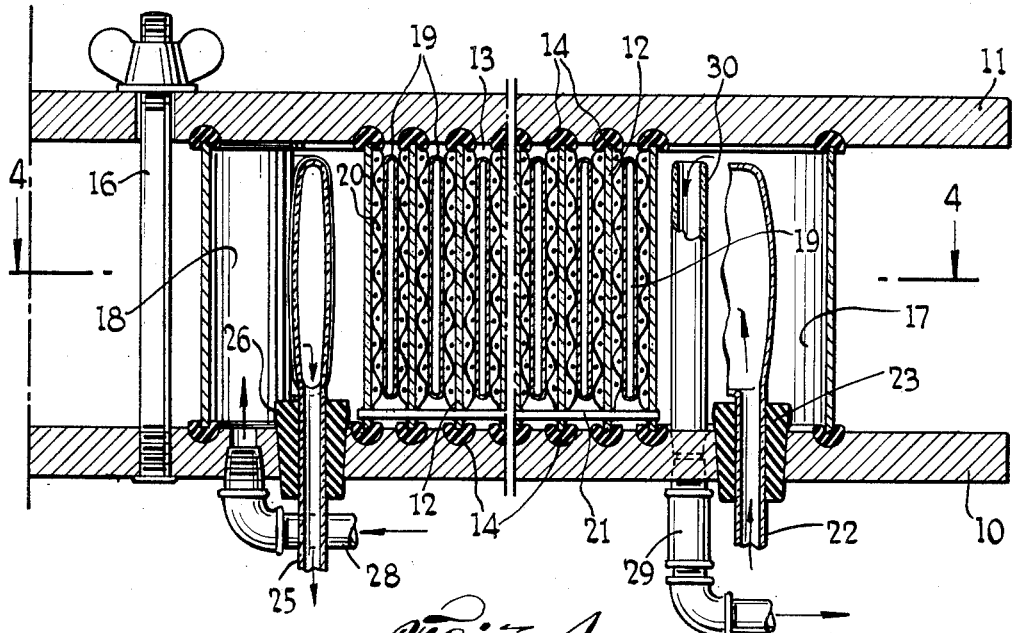
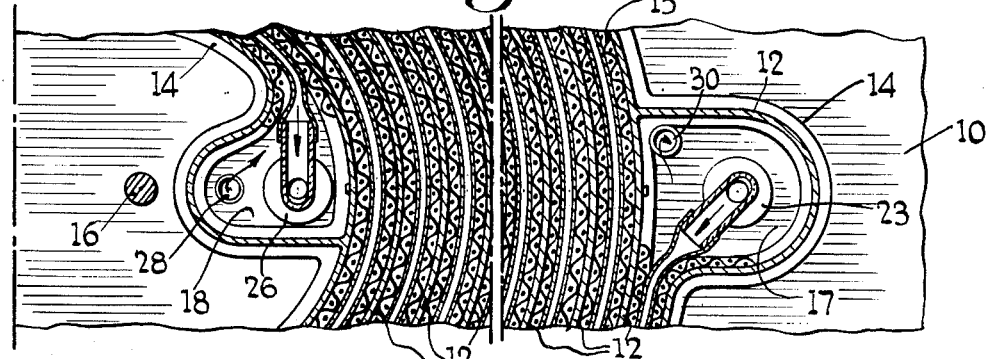
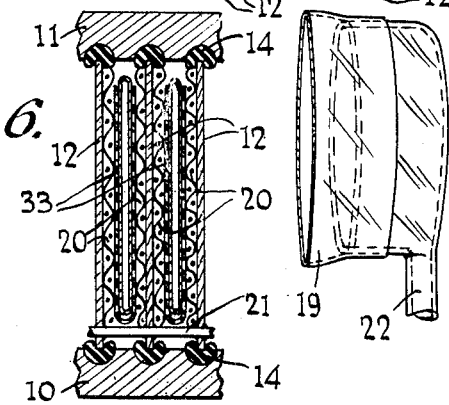

Patented Sept. 1, 1953

2,650,709

UNITED STATES PATENT OFFICE 2,650,709

CONTINUOUS EXTRACORPOREAL DIALYZER

Stephan S. Rosenak and Abraham Saltzman, New York, N. Y.

Application August 6, 1948, Serial No. 42,756

9 Claims. (Cl. 210—8.5)

This invention relates to dialyzers for purifying blood and to a method of purifying blood by dialysis. A dialyzer is an apparatus in which the migration of dissolved chemical particles separated by a semipermeable membrane takes place from one side of the membrane to the other. The present invention relates particularly to a continuous extracorporeal blood dialyzer; that is, it functions continuously to purify blood by dialysis, the blood being withdrawn from the body of a human being for conditioning or purification and then returned to the body after it has been acted upon by the dialyzer. The purpose of blood dialysis is to remove nitrogenous waste products of protein breakdown and other toxins which are not being removed by damaged kidneys and also to restore the electrolyte, water and acid-base balance of the blood and tissue fluids.

If two solutions are separated by a suitable semipermeable membrane, any percentage of a soluble material in one of the solutions may be established by maintaining a continuous stream of a solution of the same material on the other side of the membrane. The same conditions prevail if one combination of dissolved materials is opposed by a desired combination which is continuously replaced. There will be a trend toward equalization of the solutions on both sides of the membrane. This is of great importance in the dialysis of circulating blood because undesired substances may be selectively removed from the blood without removing other constituents essential for the maintenance of life. At the same time, the exchange of water through the membrane may be controlled as it is determined by the total osmotic pressure between solutions on opposite sides of the membrane, the water moving through the membrane toward the solution having the lower osmotic pressure. If circulating blood be opposed to distilled water, all kinds of dissolved particles will pass from the blood to the water, and, at the same time, a substantial amount of distilled water will pass through the membrane into the blood stream because the osmotic pressure of the blood is lower than that of distilled water. If the distilled water be replaced by a dextrose solution having the same osmotic pressure as that of the blood, then all crystalloid constituents of the blood may be removed without any exchange of water through the membrane. If the circulating blood be opposed to blood plasma of the same kind, no normal plasma constituent of the blood will pass through the membrane. However, abnormal constituents not present in the healthy plasma on the other side of the membrane will pass through the membrane and thus be removed from the blood. Therefore, the ideal dialyzing wash liquid would be normal blood plasma, but the supply of such plasma is of course limited and an artificial plasma may be used instead. Such artificial plasma may contain NaCl, CaCl$_2$, KCl, MgCl$_2$, NaH$_2$PO$_4$, and NaHCO$_3$ in about the same proportions in which they occur in normal plasma. The osmotic pressure exerted by the protein constituents of normal plasma, amounting to from 25 to 30 mm. of mercury pressure, may be neutralized by the addition of 1.5 to 2.0% of glucose to the artificial plasma, or by hydrostatic pressure difference between the circulating blood and the circulating artificial plasma. This means that if, in the dialyzing apparatus, the hydrostatic pressure of the blood is 30 mm. of mercury higher than the hydrostatic pressure of the purifying liquid, addition of glucose above physiological limits is not necessary.

The main object of the present invention is to provide an improved form of extracorporeal dialyzer adapted to function continuously for as long a period as desired to add or remove constituents to the blood so as to restore it more nearly to a normal condition.

Another object of the invention is to provide an improved dialyzing method for restoring the proportions of the constituents of blood to the proportions normally present in healthy blood.

Some of the advantages of a dialyzer constructed in accordance with the invention are that there are no sharp corners nor pockets in which the blood may collect, the flow of blood being smooth and continuous through its path. The blood flows in a closed horizontal path and the pressures of the blood and wash liquid may be independently controlled. The dialyzing operation may be conveniently observed. The dialyzing membrane is completely immersed at all times in the wash liquid to secure maximum efficiency.

Other objects and advantages of the invention will be apparent from the following description taken in connection with the accompanying drawings in which Fig. 1 is a plan view of a dialyzer constructed according to the invention, Fig. 2 is a front view of the dialyzer shown in Fig. 1, Fig. 3 is a cross section on the line 3—3 of Fig. 1, Fig. 4 is a cross section on the line 4—4 of Fig. 3, Fig. 5 is an explanatory detailed view and Fig. 6 is a small sectional view corresponding to a portion of Fig. 3 but showing a modified construction.

Like reference characters indicate similar parts in the different figures of the drawings.

The dialyzer shown in the drawings by way of exemplification includes a horizontal bottom plate 10 and a horizontal top plate 11, the two plates being spaced and held apart by a spirally arranged thin strip 12 of metal, plastic or other suitable material. The plates 10 and 11 may be formed of suitable plastic material and at least the top plate 11 may be formed of transparent plastic material to permit inspection of the interior of the dialyzer. The turns of the spiral strip 12 are spaced to form a wall defining a spiral dialyzing compartment 13. Each of the plates 10 and 11 is formed with a groove corresponding to the adjacent edge of the spiral strip 12 and provided with a gasket 14 in which the adjacent edge of the spiral strip is seated so that a liquid-tight joint is formed between the spiral strip and each plate. The spiral strip 12 with its gaskets 14 is clamped between the plates 10 and 11 by peripheral bolts 15 and a center bolt 16. Each end of the spiral strip 12 diverges away from the adjacent turn of the spiral and then bends back toward the adjacent turn to which it is soldered or otherwise secured to form a liquid-tight seal. These diverging ends of the spiral strip 12 thus provide enlarged inner and outer end compartments 17 and 18, respectively, of the spiral compartment 13.

A tubular semipermeable membrane 19 extends in a horizontal spiral through the horizontal spiral compartment 13 between its enlarged end compartments 17 and 18. This tubular membrane is flattened to increase the ratio of its surface area to its blood capacity. This tubular membrane 19 provides a path for a stream of blood which is to be conditioned and separates the blood from the wash liquid which is caused to flow through the spiral compartment 13 and along the outside surface of the tubular membrane 19. The tubular membrane 19 is preferably formed of cellophane but may of course be formed of any suitable material which will permit the desired osmotic exchange of liquids and solutions through its wall between the blood and the wash liquid. The tubular membrane 19 is spaced from the adjacent surfaces of the spiral wall 12 by strips of metal screen 20 to prevent pressure of the blood in the tubular membrane from expanding the membrane and restricting the spiral compartment 13 and thus interfering with the flow of wash liquid. Radial rods 21 extending through and secured to the turns of the spiral metal strip 12 near its lower edge maintain the turns of the spiral in proper spaced relation during assembly and disassembly of the apparatus.

A pipe 22 extends upwardly through a seal 23 in the lower plate 10 into the enlarged outer end compartment 17 of the spiral dialyzing compartment 13. The upper or inner end of this pipe 22 has a narrow side opening connected with the adjacent end of the tubular membrane 19. This pipe 22 forms an inlet for the blood stream and may be connected by a flexible tube 24 and a cannula to an artery from which the blood is forced to flow into the dialyzer and through the tubular membrane 19. A pipe 25 extends through a seal 26 in the lower plate 10 leading to the enlarged inner end compartment 18 of the dialyzer compartment 13. This pipe 25 has a narrow side opening sealed to the adjacent inner end of the spiral dialyzing membrane 19 and provides an outlet for the blood being conditioned. The pipe 25 may be connected by a flexible tube 27 and a cannula to a vein to which the blood is to be returned. The pressure of the blood in the artery thus will cause a continuous stream of blood to flow through the tubular dialyzing membrane 19. A pipe 28 communicates through an opening in the lower plate 10 with the inner enlarged end compartment 18 of the dialyzing compartment 13 and serves as an inlet for wash liquid. Another pipe 29 communicates through an opening in the lower plate 10 with the outer enlarged end compartment 17 of the compartment 13. An extension 30 of the pipe 29 terminates near the upper part of the outer enlarged portion 17 of the dialyzing compartment 13 to form the outlet for the wash liquid which is thus caused to flow in a path along the outer surface of the tubular membrane 19 and longitudinally thereof and in the direction opposite to the flow of the blood but parallel thereto. The pipes 28 and 29 are provided with valves 31, 32, respectively, to control the rate of flow of the wash liquid.

In the modification shown in the detailed cross section of Fig. 6, the construction is similar to that which has already been described except that a perforated sheet 33 is interposed between the tubular dialyzing membrane 19 and the spacing screen 20 to protect the dialyzing tube from injury by the screens. This perforated sheet is preferably formed of the same material as that of the tubular dialyzing membrane 19.

From the above discussion of the objects and purposes of the invention, its operation will be apparent. The wash liquid entering through the pipe 28 and flowing through the dialyzing compartment 13 along the outer surface of the tubular dialyzing membrane 19 is opposed to the blood entering from the pipe 22 and flowing through and along the inner surface of the tubular dialyzing membrane 19. The blood and the dialyzing liquid thus flow in substantially opposite directions along the inner and outer surfaces, respectively, of the dialyzing membrane so that a substantially constant gradient of concentration between blood and wash liquid is secured throughout their travel through the dialyzer. The capacity of the tubular dialyzing membrane 19 should be such as will provide as much surface area as possible without requiring a volume of blood greater than can be safely withdrawn from a patient at one time. It has been found that a flattened tubular dialyzing membrane will be satisfactory if it is about 2½ inches wide and 25 feet long and if it has a capacity of about 220 cu. cm. and a surface area of about 9000 sq. cm. The flow of wash liquid which is preheated to body temperature may be controlled by the valves 31 and 32 to maintain a pressure of about 25 to 30 mm. of mercury below that of the blood. Manometers 34 may be provided to indicate the pressures of the blood and of the wash liquid. This will prevent undesirable addition of water from the wash liquid to the blood. As has been explained, however, the wash liquid may contain some constituents such as salts of calcium, potassium etc. in the proportions normally present in healthy blood. Under these conditions, those constituents which are deficient in the blood stream will pass into the blood through the tubular membrane by osmosis while those constituents which are present in greater than normal proportions in the blood will pass through the tubular membrane by osmosis from the blood into the wash liquid. Thus the proportions of constituents in the blood tend to be restored to normal conditions. When it is known that the blood is particularly deficient in one or more constituents, the wash liquid may be supplied with greater than normal proportions of these constituents and if certain constituents in the blood occur in proportions which are greater than normal, then these constituents may be supplied in less than normal proportions in the wash liquid or may be omitted from it entirely. By thus using greater or lesser proportions of the constituents in the wash liquid, the rate of transfer of the constituents in either direction may be controlled as desired.

It will be appreciated that two or more blood dialyzers, such as have been described, may be connected to operate either in series or parallel but, whenever so operated, they should be placed horizontally and at substantially the same level to avoid any unnecessary difference in hydrostatic pressures of the blood and wash liquid. The dialyzer may be supported by legs 35, preferably three in number, and is easily portable.

The invention provides a highly effective means and method for improving the condition of the blood of a patient.

It should be understood that the invention is not limited to any of the exemplifications hereinbefore described but is to be derived in its broadest aspects from the appended claims.

What we claim is:

1. A continuous extracorporeal dialyzer, including two spaced plates, a relatively stiff unyielding spiral liquid-tight wall sealed edgewise between said plates and having spaced turns defining a spiral dialyzing compartment for conducting a wash liquid, an elongated tubular membrane extending spirally along said compartment for conducting the liquid to be dialized, and pipes for conducting blood to and from the ends of said tubular membrane.

2. A continuous extracorporeal dialyzer for conditioning blood, including two spaced plates, a spiral liquid-tight wall sealed edgewise between said plates and having spaced turns defining a spiral dialyzing compartment for conducting a wash liquid, the outer and inner ends of the spiral wall being sealed to the adjacent turn thereof to close the ends of the dialyzer compartment, an elongated tubular membrane extending spirally along said compartment for conducting blood, pipes for conducting wash liquid to and from the ends of the dialyzer compartment, and pipes for conducting blood to and from the ends of said tubular membranes.

3. A continuous extracorporeal dialyzer for conditioning blood as claimed in claim 2, each end of the spiral wall diverging away from the adjacent turn and then bending back and being sealed thereto to provide enlarged end portions of the dialyzer compartment.

4. A continuous extracorporeal dialyzer for conditioning blood as claimed in claim 2, in which the spiral wall, dializing compartment and tubular membrane are horizontally disposed substantially in the same plane.

5. A continuous extracorporeal dialyzer for conditioning blood as claimed in claim 2, including means for producing a flow of wash liquid through the dialyzer compartment along the outer surface of the tubular membrane and in the direction opposite to that of the flow of blood.

6. A continuous extracorporeal dialyzer for conditioning blood as claimed in claim 2, including a spacing screen between each side of the tubular membrane and the adjacent spiral wall.

7. A continuous extracorporeal dialyzer as claimed in claim 6, including a protective perforated membrane between the tubular membrane and each spacing screen.

8. A continuous extracorporeal dialyzer for conditioning blood as claimed in claim 2, the spaced plates having spiral grooves registering with the adjacent edges of the spiral wall, and gaskets in said grooves to seal the wall to the plates.

9. A continuous extracorporeal dialyzer for conditioning blood as claimed in claim 2, the tubular membrane being flattened to increase the ratio of its surface area to its blood capacity.

STEPHAN S. ROSENAK.
ABRAHAM SALTZMAN.

References Cited in the file of this patent

UNITED STATES PATENTS

| Number | Name | Date |
|---|---|---|
| 1,719,754 | Cerini | July 2, 1929 |
| 1,825,631 | Horvath | Sept. 29, 1931 |
| 1,964,391 | Thomas | June 26, 1934 |
| 2,040,805 | Casey | May 12, 1936 |
| 2,124,951 | Little | July 26, 1938 |
| 2,225,024 | Weber | Dec. 17, 1940 |
| 2,353,760 | Richards | July 18, 1944 |
| 2,365,457 | Daniel | Dec. 19, 1944 |
| 2,386,725 | Strean | Oct. 9, 1945 |
| 2,461,505 | Daniel | Feb. 15, 1949 |
| 2,502,614 | Zender | Apr. 4, 1950 |

FOREIGN PATENTS

| Number | Country | Date |
|---|---|---|
| 489,654 | Great Britain | Aug. 2, 1938 |
| 371,369 | Germany | Mar. 15, 1923 |